United States Patent
Kang

(10) Patent No.: US 8,281,905 B2
(45) Date of Patent: Oct. 9, 2012

(54) CALIPER DISC BRAKE

(75) Inventor: Jung Sik Kang, Gyeonggi-do (KR)

(73) Assignee: Mando Corporation, Gyeonggi-Do (KR)

( * ) Notice: Subject to any disclaimer, the term of this patent is extended or adjusted under 35 U.S.C. 154(b) by 421 days.

(21) Appl. No.: 12/603,252

(22) Filed: Oct. 21, 2009

(65) Prior Publication Data

US 2010/0096222 A1    Apr. 22, 2010

(30) Foreign Application Priority Data

Oct. 21, 2008   (KR) ........................ 10-2008-0102840

(51) Int. Cl.
F16D 55/18    (2006.01)

(52) U.S. Cl. ...................................... 188/72.4

(58) Field of Classification Search ................. 188/72.4, 188/72.5, 264 B, 369, 370; 92/158, 160, 92/181 R
See application file for complete search history.

(56) References Cited

U.S. PATENT DOCUMENTS

| | | | | |
|---|---|---|---|---|
| 3,750,857 A | * | 8/1973 | Marschall et al. | 188/345 |
| 3,773,148 A | * | 11/1973 | Jean-Claude et al. | 188/72.4 |
| 4,163,483 A | * | 8/1979 | Baba et al. | 188/71.8 |
| 4,798,052 A | * | 1/1989 | McAfee | 60/572 |
| 7,882,940 B2 | * | 2/2011 | Vezzoli et al. | 188/72.4 |

FOREIGN PATENT DOCUMENTS

| | | |
|---|---|---|
| DE | 196 01 434 A1 | 7/1997 |
| DE | 102 15 935 A1 | 10/2003 |
| GB | 984350 | 10/1962 |
| JP | 06-117462 | 4/1994 |
| KR | 10-0254415 B1 | 2/2000 |
| WO | WO 2008/093161 A1 | 8/2008 |

OTHER PUBLICATIONS

German Office Action issued in German Patent Application No. 10 2009 049 817.6-12, mailed Aug. 2, 2010.

* cited by examiner

*Primary Examiner* — Robert A Siconolfi
*Assistant Examiner* — Stephen Bowes
(74) *Attorney, Agent, or Firm* — McDermott Will & Emery LLP

(57) ABSTRACT

A caliper disc brake includes a caliper housing having a cylinder, a piston moving forward and backward within the cylinder, a dust seal mounted at a front end of an opening of the piston, first and second sealing members provided between an inner surface of the cylinder and an outer surface of the piston. The first sealing member is provided at the rear of the dust seal. The second sealing member is separated from the first sealing member by a designated interval. Oil channels to communicate a space around the outer circumferential surface of the piston, formed by the first sealing member and the second sealing member, and a space around the rear surface of the piston, formed by the second sealing member and the cylinder, with each other to operate a rollback function of the second sealing member are formed in the piston.

1 Claim, 2 Drawing Sheets

CALIPER DISC BRAKE

CROSS-REFERENCE TO RELATED APPLICATION

This application claims the benefit of Korean Patent Application No. 2008-0102840, filed on Oct. 21, 2008 in the Korean Intellectual Property Office, the disclosure of which is incorporated herein by reference.

BACKGROUND

1. Field

Embodiments of the present invention relate to a caliper disc brake, which improves a rollback performance of a piston.

2. Description of the Related Art

In general, braking apparatuses are used to decelerate or stop a vehicle during driving, or maintain a parked state of the vehicle, and perform a braking action by changing kinematic energy of the vehicle into heat energy using frictional force.

Each braking apparatus includes a unit to substantially perform the braking action, a braking energy supply unit, a manipulation unit, and a transmission unit.

Brakes are divided into main brakes, parking brakes, and sub-brakes according to purposes.

The main brakes are necessary to decelerate a velocity of a vehicle, or to quickly stop the vehicle according to circumstances. Most main brakes are foot-actuated brakes, which are actuated by a driver's foot, and manipulation power of a driver, i.e., a pedal pressure, is changed into braking power of a vehicle wheel via an intermedium, such as oil pressure or air pressure.

Among hydraulic main brakes, a caliper disc brake, which has a brake disc made of cast iron and rotated together with a wheel instead of a drum, brakes a wheel using frictional force obtained by pushing brake pads operated by a hydraulic piston to both outer sides of the brake disc.

The caliper disc brake includes the brake disc, a caliper, disc pads, and the piston.

The caliper includes a hydraulic pipe, to which oil pressure generated from a master brake unit by manipulation of a brake pedal is transmitted, the disc pads compressed onto both side surfaces of the brake disc by pressure of the piston, installed in the caliper and rectilinearly moving by the oil pressure, to produce friction with the brake disc so as to brake the wheel, and a piston return seal installed at the cylinder to return the piston to its former position and prevent leakage of a brake oil.

If elasticity of the conventional piston return seal is weakened, return of the piston is difficult and the disc pads are still compressed onto the brake disc even if no braking motion is carried out, and thus the brake is in an operating state at any time.

SUMMARY

Therefore, it is one aspect of the present invention to provide a caliper disc brake, which improves a rollback performance of a piston.

Additional aspects of the invention will be set forth in part in the description which follows and, in part, will be obvious from the description, or may be learned by practice of the invention.

In accordance with one aspect of the present invention, a caliper disc brake includes a caliper housing provided with a cylinder, a piston moving forward and backward within the cylinder of the caliper housing, a dust seal mounted at a front end of an opening of the piston, a first sealing member provided between the inner surface of the cylinder and the outer surface of the piston at the rear of the dust seal, and a second sealing member separated from the first sealing member by a designated interval and provided between the inner surface of the cylinder and the outer surface of the piston, wherein oil channels to communicate a space around the outer circumferential surface of the piston, formed by the first sealing member and the second sealing member, and a space around the rear surface of the piston, formed by the second sealing member and the cylinder, with each other to operate a rollback function of the second sealing member are formed in the piston.

Each of the oil channels may include a first through hole extended from the outer circumferential surface of the piston toward the center of the piston, and a second through hole bent from the first through hole and extended to the rear surface of the piston in the lengthwise direction of the piston.

A plurality of the oil channels may be formed.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
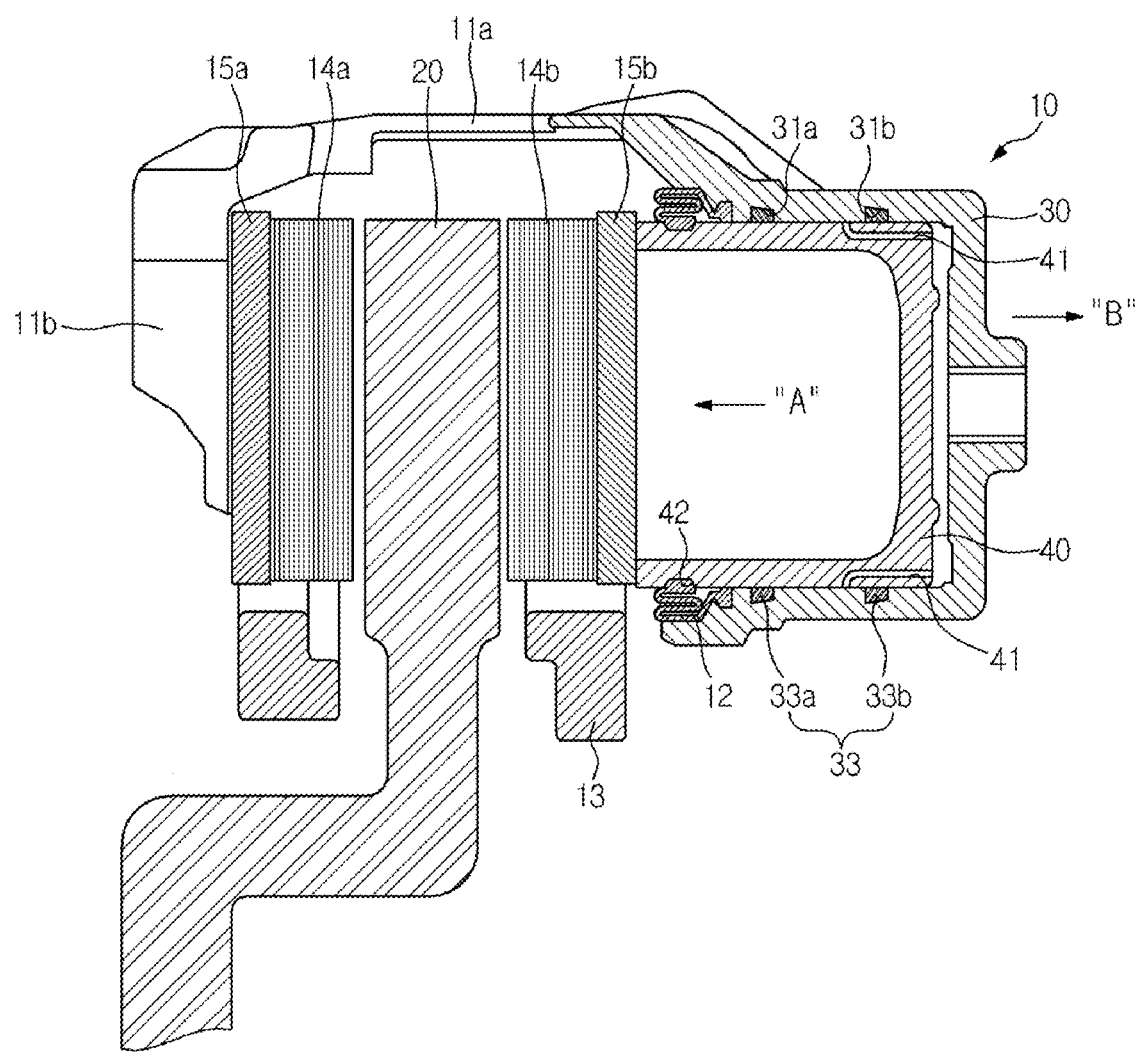
FIG. 1 is a cross-sectional view schematically illustrating a caliper disc brake in accordance with one embodiment of the present invention.

Reference will now be made in detail to the embodiments of the present invention, examples of which are illustrated in the accompanying drawings, wherein like reference numerals refer to like elements throughout.

As shown in FIG. 1, a caliper disc brake in accordance with one embodiment of the present invention includes a disc 20 rotated together with a wheel of a vehicle, first and second friction pads 14a and 14b respectively disposed at both sides of the disc 20 to apply pressure to both side surfaces of the disc 20 so as to perform braking, first and second pad plates 15a and 15b, to which the first and second friction pads 14a and 14b are attached, a caliper housing 10 to apply pressure to the first and second friction pads 14a and 14b, and a carrier 13 to support a piston 40, the first and second friction pads 14a and 14b and the caliper housing 10.

The carrier 13 supports the first and second friction pads 14a and 14b such that the first and second friction pads 14a and 14b move forward and backward toward both side surfaces of the disc 20, and supports the caliper housing 10 such that the caliper housing 10 moves forward and backward in a direction of applying pressure to the first and second friction pads 14a and 14b.

The caliper housing 10 includes a cylinder 30 provided with a bore having an opened surface opposite to the second friction pad 14b, an extension part 11a extended from the upper portion of the cylinder 30 toward the first friction pad 14a, and a finger part 11b extended from the extension part 11a and bent so as to support the rear surface of the first friction pad 14a.

In the above caliper housing 10, the cylinder 30, the extension part 11a, and the finger part 11b are formed integrally.

Guide rods (not shown) provided at both sides of the cylinder 30 are supported by both sides of the carrier 13 such that the caliper housing 10 moves forward and backward, and thus the caliper housing 10 may move forward and backward in a direction of applying pressure to the first and second friction pads 14*a* and 14*b*.

The piston 40 is installed in the bore of the cylinder 30 such that the piston 40 moves forward and backward so as to apply pressure to the second friction pad 14*b*.

The piston 40 moves forward toward the second friction pad 14*b* (in the direction of an arrow A) by the pressure of a brake oil supplied to the inside of the cylinder 30, and thus applies pressure to the second friction pad 14*b*.

A dust seal 12, which prevents dust or foreign substances from flowing into the cylinder 30 through a gap between the rear surface of the cylinder 30 and the outer surface of the piston 40, is installed at the opening of the cylinder 30.

Further, sealing members 33, which form a seal between the inner surface of the cylinder 30 and the outer surface of the piston 40 to prevent the brake oil from leaking and causes the piston 40 to move backward and then be returned to its former position after the braking motion is completed, are installed on the inner surface of the cylinder 30.

Here, first and second grooves 31*a* and 31*b* to mount the sealing members 30 are formed on the inner surface of the cylinder 30.

The sealing members 33 are ring-shaped, and the inner circumferential surfaces of the sealing members 33 are closely attached to the outer surface of the piston 40.

The sealing members 33 include a first sealing member 33*a* located adjacent to the opening of the cylinder 30, and a second sealing member 33*b* separated from the first sealing member 33*a* by a designated distance.

A dust seal mounting groove 42 to mount the dust seal 12 is formed on the outer surface of the opening of the piston 40 in the circumferential direction.

Further, oil channels 41, along which the brake oil flows, are formed in the piston 40 so as to operate a rollback function of the second sealing member 33*b*.

In detail, the oil channels 41 to communicate at a space around the outer circumference surface of the piston 40 formed by the first sealing member 33*a* and the second sealing member 33*b* and a space around the rear surface of the piston 40 formed by the second sealing member 33*b* and the cylinder 40 with each other to operate the rollback function of the second sealing member 33*b* are formed in the piston 40.

Figure 2:
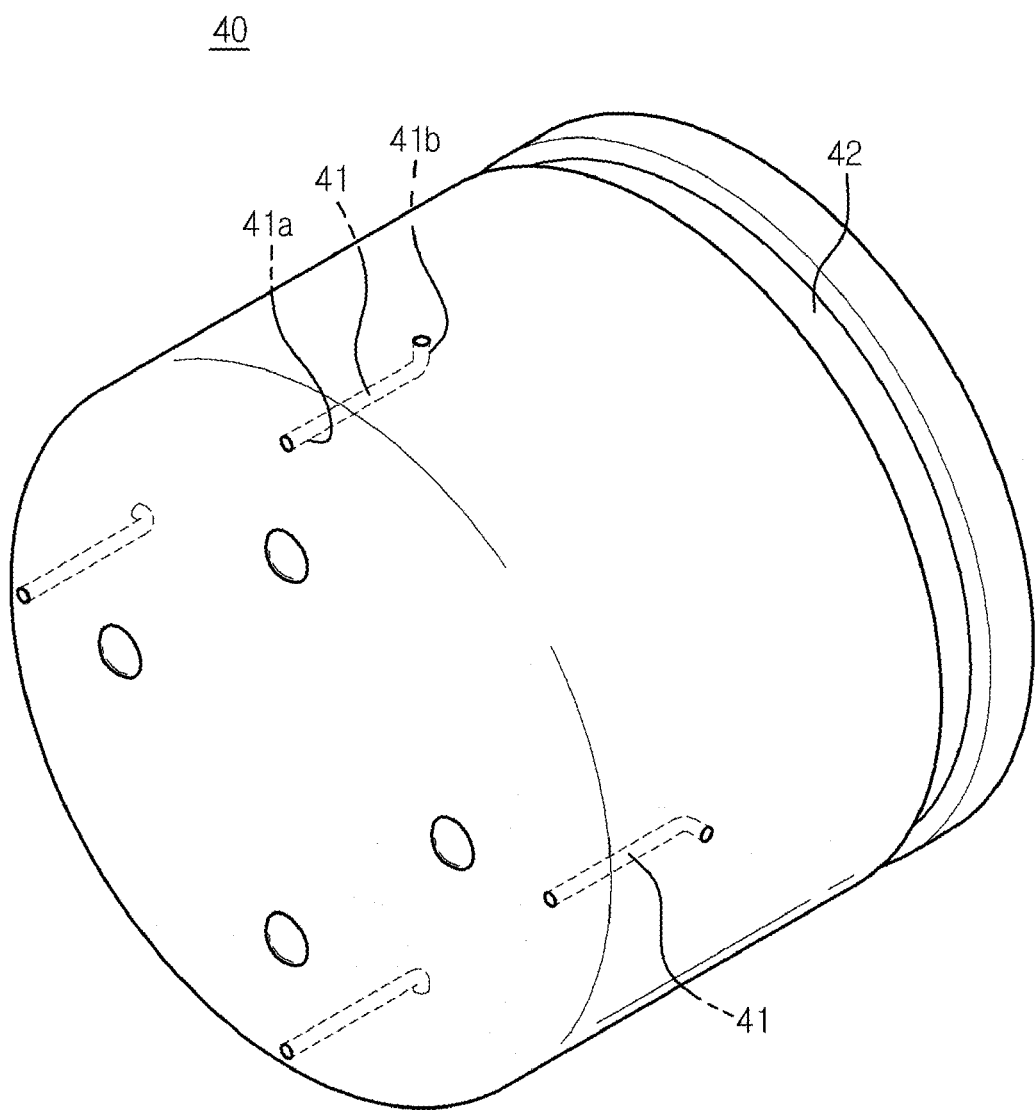
FIG. 2 is a perspective view schematically illustrating a piston of the caliper disc brake in accordance with the embodiment of the present invention.

As shown in FIG. 2, each of the oil channels 41 formed in the piston 40 includes a first through hole 41*b*, and a second through hole 41*a* formed to communicate with the first through hole 41*b*.

The first through hole 41*b* of the oil channel 41 is extended from the outer circumferential surface of the piston 40 toward the center of the piston 40, and the second through hole 41*a* of the oil channel 41 is bent from the first through hole 41*b* is extended to the rear surface of the piston 40.

A plurality of the oil channels 41 may be formed at upper, lower, right, and left portions of the piston 40.

Accordingly, when the brake oil for braking is supplied (oil pressure for braking is applied to) to the inside of the cylinder 30 of the caliper housing 10 by the braking motion of a driver, the piston 40 moves forward toward the second friction pad 14*b* (in the direction of the arrow A) and applies pressure to the second friction pad 14*b* toward the disc 30.

Simultaneously, the caliper housing 10 moves in the direction of an arrow B opposite to the movement direction of the piston 40 by the repulsion of the oil pressure acting on the inside of the cylinder 30, and thus the finger part 11*b* applies pressure to the first disc pad 14*a* toward the disc 20.

Through the above operation, the first and second friction pads 14*a* and 14*b* are compressed onto both side surfaces of the disc 20, thus achieving braking of the disc 20.

When the braking motion is completed and the oil pressure applied to the inside of the cylinder 30 is released, the piston 40 moves backward and is returned to its former position by the elasticity of the sealing members 33.

Here, the brake oil flows into the second through holes 41*a* of the oil channels 41 formed in the piston 40, and is discharged through the first through hole 41*b*, thereby facilitating the rollback function of the second sealing members 33*b*.

As is apparent from the above description, a caliper disc brake in accordance with one embodiment of the present invention improves a rollback function of a piston installed within a cylinder and prevents drag, thereby improving the performance of a vehicle.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A caliper disc brake, comprising:
a caliper housing having a cylinder;
a piston for moving forward and backward within the cylinder of the caliper housing;
a dust seal mounted at a front end of an opening of the piston;
a first sealing member disposed between an inner surface of the cylinder and an outer surface of the piston at the rear of the dust seal; and
a second sealing member separated from the first sealing member by a designated interval and disposed between the inner surface of the cylinder and the outer surface of the piston, wherein
a plurality of oil channels, to communicate a first space around an outer circumferential surface of the piston, formed by the first sealing member and the second sealing member, and a second space around a rear surface of the piston, formed by the second sealing member and the cylinder, with each other to operate a rollback function of the second sealing member, are formed in the piston, and
each of the plurality of oil channels includes a first through hole extended from the outer circumferential surface of the piston toward the center of the piston, and a second through hole bent from the first through hole and extended to the rear surface of the piston in the lengthwise direction of the piston.

* * * * *